Patented Apr. 9, 1946

2,398,154

UNITED STATES PATENT OFFICE 2,398,154

VULCANIZATION OF RUBBERLIKE MATERIALS

Robert R. Olin, Akron, and Howard I. Cramer, Cuyahoga Falls, Ohio

No Drawing. Application January 27, 1941, Serial No. 376,184

7 Claims. (Cl. 260—813)

This invention relates to the vulcanization of rubber. This application is in part a continuation of application Ser. No. 249,780 filed January 7, 1939 by Olin, Cramer and Reichard which has matured into U. S. 2,292,396.

The invention includes the method of vulcanization, the treating bath employed and the vulcanized product. The invention is applicable to the vulcanization of surgeon's gloves and other pharameutical equipment, balloons, etc. which may be made from a rubber cement or from rubber deposited from latex, crepe soles, matting, etc. and other products made of rubber whether thin films or products of considerable thickness.

According to this invention the vulcanizing ingredients are not compounded with the rubber, but are all included in a treating bath with which the rubber products are treated by dipping or spraying or other suitable process. The treated products are generally vulcanized after being treated with the vulcanizing ingredients altho both processes may be carried on simultaneously. Where possible the vulcanization is preferably effected at, or about, room temperature. The treating bath comprises a disubstituted ammonium salt of a disubstituted dithiocarbamate and a metal salt of a disubstituted dithiocarbamate (both derived from secondary amines) or their reaction products, together with sulfur or a suitable source of sulfur.

For rapid vulcanization, particularly at room temperature, or thereabouts, and also where it is necessary for the vulcanizing bath to penetrate the rubber to a depth greater than 0.001 inch best results have been obtained using no more than two mols of the metal salt for each mol of the ammonium salt and preferably using the metal salt and the ammonium salt in the proportion of one half to two mols of the metal salt to one mol of the ammonium salt.

A possible explanation of the mechanism by which such increased activity is obtained is that the combination of the metal and ammonium salts of the dithiocarbamates is more readily soluble in the rubber-like material than either would be alone, and in addition the combination possesses greater activity to accelerate vulcanization particularly at low temperatures, i. e. near room temperature.

Latex appears to contain some ingredient absent from pale crepe which in some way contributes to the reaction and aids in the penetration of the rubber deposited from the latex.

For thin films where penetration of less than 0.001 inch is required it will be found that the use of the zinc salt and ammonium salt in the proportion given will produce a rapid cure at low temperatures, i. e. temperatures below about 100° F. Using other proportions a good cure can be obtained, but elevated temperatures or longer curing periods will be required.

In a preferred form of the invention a dialkyl ammonium salt of a dialkyl dithiocarbamate and a zinc dialkyl dithiocarbamate are used. Altho the zinc salt will usually be employed it is to be understood that salts of cadmium, lead and other metals whose oxides are accelerator activators may be used as will be evident to the man skilled in the art. Aliphatic dithiocarbamates will ordinarily be employed.

The derivatives used must of course be soluble or dispersed in the vehicles employed. The lowest members of the series viz. the dimethyl and diethyl derivatives are preferably used in water solutions or dispersions and the higher members, e. g. the dibutyl and diamyl derivatives are generally preferred for use in the ordinary organic solvents in which they are soluble. The propyl derivatives may be used. Altho the higher aliphatic compounds, such as dihexyl, etc. may be used and aralkyl derivatives such as the dibenzyl compounds and also mixed compounds such as zinc butyl phenyl (or methyl phenyl or ethyl benzyl, etc.) dithiocarbamate and butyl phenyl (or methyl phenyl or ethyl benzyl, etc.) ammonium butyl phenyl (or methyl phenyl or ethyl benzyl, etc.) dithiocarbamate may be used, the diethyl, dibutyl or diamyl derivatives which are or may soon be available on the market will ordinarily be employed. It is not necessary that the same substituents occur in each of the nitrogen groups of the ammonium compound or that the zinc and ammonium compounds be similarly substituted.

There are many advantages in the vulcanization treatment of this invention as will be evident, at least in part, from the following description and examples. For instance, products may be vulcanized at low temperatures without deformation of design. Crepe shoe soles may be died out of virgin crepe and vulcanized without deforming the shape of the soles. Thin films of rubber vulcanized according to the process of this invention give high elongation under low load as compared to similar films vulcanized in the more usual ways. Moreover by eliminating the necessity of compounding powders with latex this process of vulcanization eliminates the possibility of the formation of pin-holes in balloons and other thin latex goods due to undispersed powder agglomerates.

Likewise, as the incorporation of ingredients in the latex is avoided according to this process the danger of coagulation or premature vulcanization of the latex is eliminated. The danger of premature vulcanization having been eliminated, the vulcanizing ingredients may be used in amounts which give more rapid cures than are otherwise obtainable.

Matting is now molded in long lengths in presses and a section at each overlap between successive cures is overcured. If the design of the mat is not exactly registered each time the cure is extended the mat becomes unsightly in appearance. According to the process of this invention a uniform design may be applied to the uncured matting by an engraved calender roll and the matting may then be dipped into the treating bath or sprayed with it, and then after evaporating the bath the matting may be vulcanized, in a roll if desired, at room temperature or by heating. Other similar applications will occur to the man skilled in the art of rubber manufacture.

In carrying out the invention all of the ingredients necessary to vulcanization are incorporated in a vulcanizing bath. The material to be vulcanized may be dipped into the bath or the bath may be sprayed onto or otherwise applied to the material. In general, organic solvents are satisfactory for use in the bath but as some of them are inflammable or expensive a water dispersion may be used or a water dispersion of part of the materials mixed with a water solution of part of the materials may be preferred.

In addition to incorporating the vulcanizing ingredients in the treating solution, soluble colors may be added. These are diffused into the rubber films along with the vulcanizing ingredients. Also, soluble softeners such as lauric acid, oleic acid, etc., may be added to the treating solution and they also are absorbed into the rubber. For example a soluble color or a soluble softener or both may be added to a bath used for imparting vulcanizing ingredients to a balloon or other thin film product made from rubber deposited from latex. The incorporation of soluble colors by means of the solution avoids possible pin holes due to the present method of dispersing colored powders into liquid rubber latex. The incorporation of softeners by means of a treating solution avoids the necessity of emulsifying such softeners with liquid rubber latex, which emulsions are difficult to process. The color and softener must be soluble in both the treating bath and the rubber treated with the bath.

The invention will be further described in the following examples which are illustrative only and the invention is not limited thereto.

*Example 1*

The process of this example is applicable to the treatment of a shaped article of rubber. The rubber may be Pará rubber, smoked sheet, pale crepe or the like. The rubber may be milled on a mill and pigments, fillers and the like may be added to it on the mill, altho the necessary vulcanizing ingredients are all contained in the treating bath referred to below.

It contains no vulcanizing ingredient and may therefore be molded to any desired shape at a high temperature without danger of prevulcanization, and the molded stock may be stored indefinitely before curing. Any overflow from the molding operation may be reused.

At any convenient time after molding, a treating bath prepared according to this invention is applied to the molded material either by immersion of the articles therein, or otherwise. The treating bath may comprise:

| | | |
|---|---|---|
| Benzol | cc | 25 |
| Carbon disulfide | cc | 15 |
| Methanol | cc | 60 |
| Zinc laurate | gm | 1.80 |
| Dibutyl xanthic disulfide | gm | 5.75 |
| Diamylamine | gm | 3.00 |

Zinc laurate is used instead of zinc oxide because it is soluble in the mixture of solvents employed. Any other soluble or dispersible zinc salt may be used, such as the stearate, etc.

When the ingredients mentioned are mixed in the proportions given sulfur is liberated. It appears that the xanthic disulfide reacts with the diamylamine to give diamyl ammonium diamyl dithiocarbamate, $(C_5H_{11})_2N.C.(:S)S.NH_2(C_5H_{11})_2$. It is probable that the carbon disulfide reacts with the diamylamine to also produce the same compound. No doubt a part of this ammonium salt reacts with the zinc salt and carbon disulfide to form zinc diamyl dithiocarbamate according to the following equation:

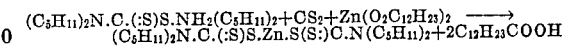
$(C_5H_{11})_2N.C.(:S)S.NH_2(C_5H_{11})_2+CS_2+Zn(O_2C_{12}H_{23})_2 \longrightarrow$
$(C_5H_{11})_2N.C.(:S)S.Zn.S(S:)C.N(C_5H_{11})_2+2C_{12}H_{23}COOH$ In this treating bath the molar ratio of the zinc diamyl dithiocarbamate to the diamyl ammonium diamyl dithiocarbamate is about 0.7 to 1.0.

The vehicle of the treating bath may vary, and the vehicle used may depend upon the material treated, etc. A mixture of benzol and methanol (free from water) in the above proportions has been found satisfactory for the treatment of balata. The benzol is a solvent and therefore makes a good penetrant. Its solvent action is reduced or inhibited by the methanol.

For the treatment of articles of substantial thickness the vehicle used must be one in which the vulcanizing ingredients are dissolved or dispersed so that they may be dissolved or otherwise transferred into the rubber-like material being treated. For very thin goods, such as films no thicker than 0.001 inch substantial penetration seems unnecessary and a surface reaction appears to suffice. If the article is relatively thick and a treating time of one or two minutes is required a rubber solvent may also be used if the surface is smooth. If the surface is covered with a molded design, treatment for this length of time with a rubber solvent without an inhibitor will probably prove detrimental to the design. Benzol, gasoline, carbon tetrachloride and carbon disulfide have been used as rubber solvents. The action of these solvents may be inhibited by methyl alcohol, free from water.

Although the method of mixing the different ingredients of the foregoing formula may be varied, the carbon disulfide is preferably first poured into the benzol. The carbon disulfide and benzol mixture is then poured into the methanol. The zinc laurate may be dissolved in the diamylamine or other high boiling point amine such as dibutyl amine, etc., in the proportions shown in the above example by heating the solution while agitating it for approximately fifteen minutes at the temperature of boiling water. Alternatively, the zinc laurate may be dissolved in the diamylamine or other amine at a lower temperature, e. g. between 100 and 120° F. by allowing it to stand a longer time, for example, 24 or 48 hours. This alternative method of mixing substantially eliminates fuming of the diamylamine which may be objectionable.

The zinc laurate and diamylamine mixture is then preferably cooled to room temperature, e. g. approximately 70° F. This cooled solution is then added to the mixture of carbon disulfide, benzol and methanol and stirred. Finally the dibutyl xanthic disulfide (known as an accelerator and commonly termed "C P B") is added to this mixture and stirred. 0.30 or more grams of sulfur may be substituted for the xanthic disulfide. The speed of the cure may be increased by adding about 0.45 gram of sulfur to the bath. It may be added to the bath by dissolving it in the carbon disulfide.

The articles are then treated with this bath. If they are immersed they should be allowed to remain in the bath until thoroughly and substantially uniformly impregnated and then removed. The vulcanization may be completed by curing at room temperature or by heating to hasten vulcanization, as for example by heating in an oven for 50 to 75 hours maintained at a temperature between 95 to 105° F. Heating to this temperature volatilizes the benzol and methanol or other vehicle employed in the vulcanizing bath.

*Examples 2, 3, 4, 5 and 6*

The following formulae illustrate other baths comprising the zinc salt and ammonium salt in different proportions. The table includes, in addition to the ingredients employed the amount of each accelerator formed by the ingredients after reacting with one another and the ratio of the mols of the zinc salt to the mols of the ammonium salt.

Examples 5 and 6 are practically the same (excepting the lauric acid formed in Example 5) except that in Example 5 the ingredients are added to the bath and react therein to form the accelerators, whereas in Example 6 the accelerators are formed before being added to the bath. The two baths may be used interchangeably for vulcanization.

|  | Example | | | | |
| --- | --- | --- | --- | --- | --- |
|  | 2 | 3 | 4 | 5 | 6 |
| Methanol (water-free) cc__ | 60 | 60 | 60 | 60 | 60 |
| Benzol_____cc__ | 25 | 25 | 25 | 25 | 25 |
| Carbon disulfide_____cc__ | 15 | 15 | 15 | 15 | 15 |
| Sulfur_____gm__ | 0.75 | 0.75 | 0.75 | 0.75 | 0.75 |
| Dibutyl amine_____gm__ | 1.50 | 1.50 | 2.50 | 1.30 | -------- |
| Zinc laurate_____gm__ | 2.25 | 1.08 | 1.80 | 1.50 | -------- |
| Dibutyl ammonium dibutyl dithiocarbamate____gm__ | -------- | -------- | -------- | -------- | 0.55 |
| Zinc dibutyl dithiocarbamate_____gm__ | -------- | -------- | -------- | -------- | 1.57 |

AFTER REACTION OF THE INGREDIENTS

| Dibutyl ammonium dibutyl dithiocarbamate____gm__ | 0.32 | 1.16 | 1.94 | .60 | (0.55) |
| --- | --- | --- | --- | --- | --- |
| Zinc dibutyl dithiocarbamate_____gm__ | 2.32 | 1.11 | 1.85 | 1.53 | (1.57) |
| Total accelerator___ | 2.64 | 2.27 | 3.79 | 2.13 | (2.12) |
| Mols zinc salt/mols ammonium salt_____ | 5.2/1 | 0.67/1 | 0.67/1 | 1.8/1 | 2/1 |

It will be noted that the molar ratio of the zinc salt to the ammonium salt in the bath of Example 2 is outside the preferred ratio of this invention. The bath may be used for vulcanization of thin films, but the cure will not be rapid at room temperature. It may be hastened by heating. The bath of Example 2 does not give penetration of thick rubber-like materials sufficient for satisfactory cures. For this purpose the molar ratio of the zinc salt to the ammonium salt should not exceed about two to one; furthermore the use of the salts in this ratio gives rapid cures of thin films at room temperature.

Thin films of rubber deposited from latex or rubber cements, etc., exposed for several seconds, e. g. four to six seconds to the bath of Examples 3, 4, 5 or 6 will cure rapidly at temperatures under 100° F., e. g. at room temperature. Thick articles of rubber may be impregnated with these baths and will subsequently give good cures on heating, as explained in connection with Example 1. The time of treatment will depend upon the thickness of the article.

*Examples 7 and 8*

The solvents used in the foregoing examples are highly inflammable. The following non inflammable water mixtures were made to show the effect on rubber of varying the molar ratio of the zinc salt to the ammonium salt in solutions of this type. In addition to showing the amount of each ingredient used in preparing each bath the table shows the amount of each accelerator formed after reaction of the ingredients and the molar ratio of the zinc salt to the ammonium salt in each case.

|  | Example | |
| --- | --- | --- |
|  | 7 | 8 |
| Distilled water_____gm__ | 100 | 160 |
| Sulfur_____gm__ | 1 | 0.75 |
| Diethylamine oleate_____gm__ | 1 | 1 |
| Zinc oxide (black label Kadox)___gm__ | 1 | -------- |
| Diethyl ammonium diethyl dithiocarbamate gm__ | 2 | 0.5 |
| Zinc diethyl dithiocarbamate_____gm__ | -------- | 1.5 |

AFTER REACTION OF THE INGREDIENTS

| Diethyl ammonium diethyl dithiocarbamate gm__ | -------- | 0.5 |
| --- | --- | --- |
| Zinc diethyl dithiocarbamate_____gm__ | 1.62 | 1.5 |
| Mols zinc salt/mols ammonium salt_____ | Infinite | 1.8/1 |

After the reaction Example 7 contained 0.64 gram of zinc oxide in excess of that required to form zinc diethyl dithiocarbamate.

The diethylamine oleate is used as a dispersing agent.

The bath of Example 7 will not penetrate a thick sheet of rubber. It may be used for treating a thin film no thicker than about 0.001 inch thick, if the cure is subsequently effected by heating. Example 8 used on such thin films will give a rapid cure at room temperature. It will also penetrate thick materials.

For example, rubber sheets 0.03 inch thick deposited from latex were treated for thirty minutes in each of the baths while the baths were gently agitated. On heating the treated sheets, those treated with the bath of Example 7 were poorly cured as evidenced by slow recovery on stretching. Apparently the sheets were cured only on the surface. The sheets treated with the bath of Example 8 were very satisfactorily cured.

Examples 9 and 10

A series of comparative tests were run on materials treated in the following baths:

| | Example 9 | Example 10 |
|---|---|---|
| Benzol cc | 100 | 100 |
| Dibutyl ammonium dibutyl dithiocarbamate g | 0.97 | 0.38 |
| Zinc dibutyl dithiocarbamate g | 1.15 | 1.75 |
| Sulfur g | 0.75 | 0.75 |

In Example 9 the molar ratio of the zinc salt to the ammonium salt is about 0.8 to 1.0 and in Example 10 it is about 3.3 to 1.0.

Latex films about 0.010 inch thick were treated with the two baths, on only one side, for 80 seconds and samples of each were curved at 80° F. and 90° C. Satisfactory cures were obtained on films treated in the bath of Example 9. The cures of the films treated with Example 10 were not as good.

A gasoline cement consisting of 80% of pale crepe rubber and 20% Suprex whiting was cast into films which on drying were 0.010 inch thick. After the solvent was completely evaporated both sides of the films were treated in the baths for 20 seconds. Samples of each were then cured at 80° F. and 90° C. The films treated in the bath of Example 9 were satisfactory and those treated in the bath of Example 10 were unsatisfactory.

The latex and cement films treated in the bath of Example 9 gave more rapid cures than those treated in the bath of Example 10. The latter contains too high a ratio of the zinc salt to give satisfactory penetration.

Example 11

| | | |
|---|---|---|
| Benzol | cc | 53 |
| Carbon tetrachloride | cc | 42 |
| Carbon disulfide | cc | 5 |
| Sulfur | gm | 0.75 |
| Zinc laurate | gm | 1 |
| Dibutyl amine | gm | 1 |

AFTER REACTION OF THE INGREDIENTS

| | | |
|---|---|---|
| Dibutyl ammonium dibutyl dithiocarbamate | gm | 0.57 |
| Zinc dibutyl dithiocarbamate | gm | 1.02 |
| Mols zinc salt/mols ammonium salt | | 1.25/1 |

A film of uncompounded rubber latex about 0.01 inch thick was deposited on the outside of a 1″ x 8″ test tube and dried. This was immersed for one minute in the above treating bath to within about ¼ inch of the top of the deposited film. In this way contact of the treating bath with the uncoated top of the test tube was avoided. This eliminated the necessity of cleaning the uncovered top of the test tube between formations and treatments of successive films.

After the solvent had superficially evaporated from the treated film the top of the film (including the untreated portion) was rolled down in the conventional manner for a distance of about one inch to form a roll or bead, as is common in the art in the formation of balloons, gloves, etc. The film was then vulcanized by heating in air for thirty minutes at 95° C. The film including the bead was fully vulcanized. The bead formed a perfectly bonded unit with the rest of the film.

One day after the film was cured it was tested for stress-strain and tensile properties. Red, white, green and yellow latex toy balloons of reputable make and available on the market were similarly tested. The average of the latter is listed under the heading "Commercial" for comparison with the films treated in the bath of Example 11.

| | Commercial | Example 11 |
|---|---|---|
| Film thickness inches | 0.012 | 0.010 |
| Load per sq. in. at 100% elongation pounds | 50 | 0 |
| Load per sq. in. at 300% elongation do | 150 | 0 |
| Load per sq. in. at 500% elongation do | 485 | 60 |
| Load per sq. in. at 700% elongation do | 2,170 | 720 |
| Load per sq. in. at 900% elongation do | Failure | 3,200 |
| Load per sq. in. at break do | 5,450 | 5,080 |
| Elongation at break percent | 885 | 1,000 |

Although there is no substantial difference in the ultimate strength of the two, both being good and well above 4500 pounds, the ultimate elongation of the material treated with the bath of Example 11 is considerably better than that of the commercial product. Also the modulus of the material treated with the bath of Example 11 is very much below that of the commercial material. For instance, at 700% elongation the load is less than 1000 pounds per square inch. This soft vulcanization, with good tensile and elongation properties finds various useful applications.

The toy balloons presently available on the market are difficult for small children to inflate. The lower modulus shows that toy balloons treated with the vulcanizing bath of this invention and then cured will be much easier for children to inflate.

It is thus seen that wide variation in the composition of the treating baths is permissible, and the invention is not limited to the variations indicated by the examples. The nature and the proportions of the ingredients employed, and also the temperatures and lengths of treatment may be varied. Variations in the suggested procedure will be evident to the man skilled in the art, as for example, the use of derivatives of the dithiocarbamate compounds here mentioned, such as amine addition compounds. Reference to dithiocarbamates in the claims is not to be construed so strictly as to exclude derivatives thereof, where operative.

We claim:

1. The method of vulcanizing zinc-free rubber which comprises impregnating the rubber thoroughly and substantially uniformly with vulcanizing ingredients by treating it with a sulphur-containing bath of a hydrocarbon-disubstituted dithiocarbamate of a metal whose oxide is an accelerator activator and a hydrocarbon-disubstituted ammonium salt of a hydrocarbon-disubstituted dithiocarbamate, the ratio of the amounts of the two salts in the bath being not more than two mols of the metal salt to one mol of the ammonium salt, and then vulcanizing the impregnated rubber.

2. The method of vulcanizing zinc-free rubber which comprises impregnating the rubber thoroughly and substantially uniformly with vulcanizing ingredients by treating it with a sulphur-containing bath of a hydrocarbon-disubstituted dithiocarbamate of a metal whose oxide is an accelerator activator and a hydrocarbon-disubstituted ammonium salt of a hydrocarbon-disubstituted dithiocarbamate, the ratio of the amounts of the two salts in the bath being between one half to two mols of the metal salt to one mol of the ammonium salt, and then vulcanizing the impregnated rubber.

3. The method of vulcanizing a film of zinc-free rubber deposited from latex which comprises impregnating the film thoroughly and substantially uniformly with vulcanizing ingredients by treating it with a sulphur-containing bath of hydrocarbon-disubstituted dithiocarbamate of a metal whose oxide is an accelerator activator and hydrocarbon-disubstituted ammonium salt of a hydrocarbon-disubstituted dithiocarbamate, the ratio of the amounts of the two salts in the bath being not more than two mols of the metal salt to one mol of the ammonium salt, and then vulcanizing the impregnated film.

4. The method of vulcanizing a film of zinc-free rubber deposited from latex which comprises impregnating the film thoroughly and substantially uniformly with vulcanizing ingredients by treating it with a sulphur-containing bath of a hydrocarbon-disubstituted dithiocarbamate of a metal whose oxide is an accelerator activator and a hydrocarbon-disubstituted ammonium salt of a hydrocarbon- disubstituted dithiocarbamate, the ratio of the amounts of the two salts in the bath being between one half to two mols of the metal salt to one mol of the ammonium salt, and then vulcanizing the impregnated film.

5. The process of vulcanizing zinc-free rubber which comprises impregnating the rubber thoroughly and substantially uniformly with a bath containing one half to two mols of a hydrocarbon-disubstituted dithiocarbamate of a metal whose oxide is an accelerator activator each mol of a hydrocarbon-disubstituted ammonium salt of a hydrocarbon-disubstituted dithiocarbamate in a mixture of gasoline and anhydrous methyl alcohol and, after incorporating sulfur therein, impregnating the rubber therewith, and then vulcanizing the impregnated rubber.

6. The process of vulcanizing zinc-free rubber which comprises dissolving a soap of a metal whose oxide is an accelerator activator in a hydrocarbon-disubstituted amine and then dissolving the mixture in a solution containing sufficient carbon disulfide to convert all of the amine to a dithiocarbamate and employing the materials in such a ratio as to produce one half to two mols of hydrocarbon-disubstituted metal dithiocarbamate for each mol of hydrocarbon-disubstituted ammonium salt of a hydrocarbon-disubstituted dithiocarbamate produced, and impregnating the rubber thoroughly and substantially uniformly with the resulting solution after incorporating sulphur therein, and then vulcanizing the impregnated rubber.

7. A vulcanized toy balloon formed of rubber film deposited from latex which has a modulus below one thousand pounds per square inch at seven hundred per cent elongation and an ultimate tensile strength of at least forty five hundred pounds per square inch obtained by vulcanization after thorough and substantially uniform impregnation of the film with a sulphur-containing bath of a hydrocarbon-disubstituted dithiocarbamate of a metal whose oxide is an accelerator activator and a hydrocarbon-disubstituted ammonium salt of a hydrocarbon-disubstituted dithiocarbamate, the ratio of the amounts of the two salts being not more than two mols of the metal salt to one mol of the ammonium salt.

ROBERT R. OLIN.
HOWARD I. CRAMER.